United States Patent [19]

Takahashi et al.

[11] Patent Number: 4,894,735
[45] Date of Patent: Jan. 16, 1990

[54] DISK DRIVE HOUSING STRUCTURE

[75] Inventors: Mikio Takahashi, Odawara; Yoshihiro Moribe; Hideo Maekawa, both of Chigasaki; Takaaki Abo, Odawara; Yasuo Yamamoto, Odawara; Shigeo Nakamura, Odawara; Osamu Beppu, Odawara, all of Japan

[73] Assignee: Hitachi, Ltd., Tokyo, Japan

[21] Appl. No.: 206,270

[22] Filed: Jun. 13, 1988

[30] Foreign Application Priority Data

Jun. 26, 1987 [JP] Japan ................................ 62-157632

[51] Int. Cl.⁴ ............................................ G11B 5/012
[52] U.S. Cl. ................................. 360/97.01; 360/98.02
[58] Field of Search ............... 360/97.01, 97.02, 97.03, 360/98.01, 98.02, 98.07

[56] References Cited

U.S. PATENT DOCUMENTS

| | | | |
|---|---|---|---|
| 4,692,827 | 9/1987 | Biermeier et al. | 360/97.03 |
| 4,714,972 | 12/1987 | Biermeier et al. | 360/98.02 X |
| 4,782,410 | 11/1988 | Okutsu | 360/105 |

FOREIGN PATENT DOCUMENTS 58-102364 6/1983 Japan .
60-101772 6/1985 Japan .
60-182077 9/1985 Japan .

Primary Examiner—Stuart N. Hecker
Assistant Examiner—David J. Severin
Attorney, Agent, or Firm—Kenyon & Kenyon

[57] ABSTRACT

A disk drive housing structure has a rotating disk for recording information and a transducer adapted to write and read information on and from the disk. The structure further includes a positioning system having at least an arm to which the transducer is fixed and which is adapted to selectively position the transducer along the radial direction of the disk transducer by turning the arm. The structure also includes a member on which the disk, transducer and positioning system are mounted, wherein the mounting member includes a first housing which supports thereon both ends of a rotary shaft of the recording medium and both ends of a rotary shaft of the positioning system, and which has a first aperture part. The first housing further includes a second aperture part through which the disk and the rotary shaft supporting the disk are inserted and to which a supporting member for the rotary shaft of the recording medium is fixed.

10 Claims, 1 Drawing Sheet

DISK DRIVE HOUSING STRUCTURE

BACKGROUND OF THE INVENTION

1. Field of the Invention

This invention relates to a disk unit, and more particularly to a magnetic disk unit having a spindle rotating at a high speed of not less than 4000 rpm, and a housing structure suitable for providing a high-speed (about 10 ms) positioning system.

2. Description of the Prior Art

In a conventional disk unit, a housing is divided by a plane in parallel with a spindle passing through the surfaces of disks, and the spindle and disks and an actuator are inserted through the dividing plane into the divisional housings as disclosed in Japanese Patent Laid-Open Nos. 182077/1985 and 101772/1985. These publications disclosing the known techniques show that a seal is provided between the contact surfaces of the divisional housings so as to shut off the interior of the housing from the outside air.

According to the conventional techniques described above, the housing is divided by a plane in parallel with the spindle passing through the surface of a disk in spite of the necessity of supporting the spindle and a rotary shaft of the actuator at both ends thereof on the walls of a highly rigid housing. Therefore, the side walls supporting the ends of the spindle and rotary shaft tend to deflect in the direction of the spindle, and it is difficult to maintain the relative position of and the relative distance between the axes of the spindle and actuator at predetermined levels. Consequently, the relative displacement, which occurs due to the variation of the ambient temperature, of a plurality of magnetic heads and the recording tracks thereon causes a decrease in the reliability of the reading and writing capability of the disk unit.

Since the side walls mentioned above are sealed hermetically with the second divisional housing, which is opposed to the first divisional housing via the seal, the heat occurring in the spindle and actuator is rarely transmitted to the second divisional housing. As a result, a difference occurs between the temperatures of the interior of these two divisional housings, so that the thermal displacement referred to above is accelerated. Moreover, since the rigidity of the side walls supporting the spindle is low, the side walls cannot with stand the force generated by the high-speed (not less than 4000 rpm) rotation of the spindle and disks and transmitted thereto. This adversely affects the positioning accuracy of the actuator.

According to the conventional techniques, a magnetic disk is set on a spindle after the servo information has been written thereon. Therefore, when the spindle inclines, the servo track becomes eccentric in many cases.

SUMMARY OF THE INVENTION

A first object of the present invention is to provide a highly rigid housing.

A second object of the present invention is to provide a disk unit capable of minimizing the eccentricity of a servo track.

To achieve these objects, the present invention provides a disk unit with an information writing and reading means, having a rotating recording medium, a converter adapted to write and read information on and from the recording medium, a positioning system adapted to position the converter selectively in the radial direction of the recording medium by turning the same, and a member on which the recording medium, converter and positioning system are supported, wherein the member includes a first housing which supports thereon both ends of a rotary shaft of the recording medium and both ends of a rotary shaft of the positioning system, and which has a first aperture part.

DETAILED DESCRIPTION

First, an outline of the operation of the characteristic structure of the present invention will be given. According to the present invention, both ends of a rotary shaft of a recording medium and those of a rotary shaft of a positioning system are supported on a first housing via bearing structures. Since more than one member is not interposed between these bearing structures supporting the mentioned two rotary shafts, what causes thermal unevenness to occur in the disk unit can be reduced to a minimum level, and the parallel positional relation between the two rotary shafts can always be kept normal. Therefore, the positioning accuracy of the positioning system can be improved easily.

Since the rotary shafts of the recording medium and positioning system are supported on the highly rigid, integrally formed first housing via the bearing structures, the occurrence of vibration, which hampers a highly-accurate head positioning control operation, can be suppressed greatly.

Moreover, a third aperture part is provided so that the servo information can be written on servo disk after a plurality of magnetic disk have been installed in the disk unit. Accordingly, a servo track which is rarely made eccentric can be written on the servo disk installed in an assembled unit.

The foregoing and other objects, advantages, manner of operation and novel features of the present invention will be understood from the following detailed description when read in connection with the accompanying drawings.

Figure 1:
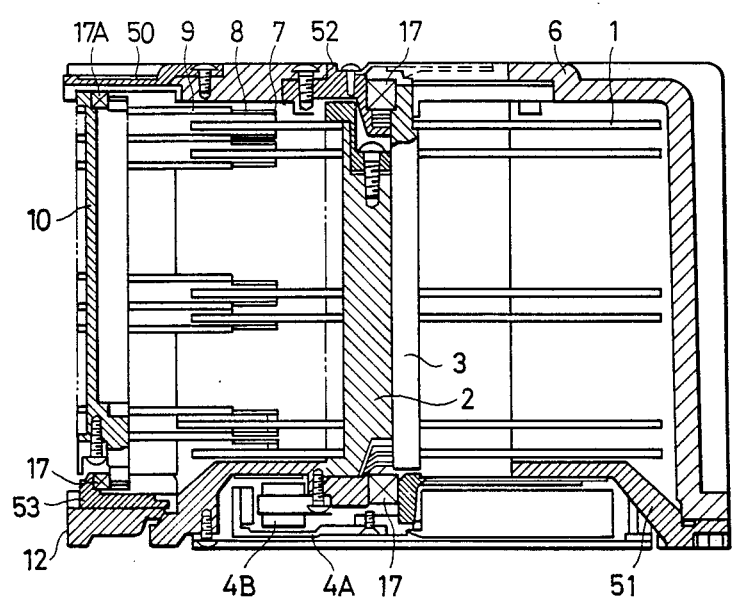
FIG. 1 is a longitudinal section of a first housing of an embodiment of the magnetic disk unit according to the present invention.

FIG. 1 is a construction diagram of a magnetic disk unit which is provided with a spindle hub 2 with a plurality of magnetic disks 1 stacked thereon, a rotary spindle 3 for rotating the hub 2, and a spindle motor 4 (4A, 4B). The rotary spindle 3 is supported at its both ends on a first housing 6 via bearing structures 51, 52. The spindle motor 4 consists of a stator 4A and a rotor 4B as shown in the drawing.

A magnetic head 7 is fixed to a head arm 9 via a load arm 8, and a plurality of combinations of these parts are stacked on and fixed to an actuator hub 10. The actuator hub 10 is supported at its both ends on the first housing 6 via the bearing structures 52, 53 in the same manner as the rotary spindle 3, and adapted to be rotated by a VCM (voice coil motor). Bearings 17 are provided in the bearing structures 5 (50, 51, 52, 53).

The first housing 1 has a dividing surface 12 parallel to the rotary spindle 3 and the rotary shaft of the actuator hub 10 and extending at substantially a right angle to a plane including these two rotary shafts, and a first aperture part 18.

Figure 2:
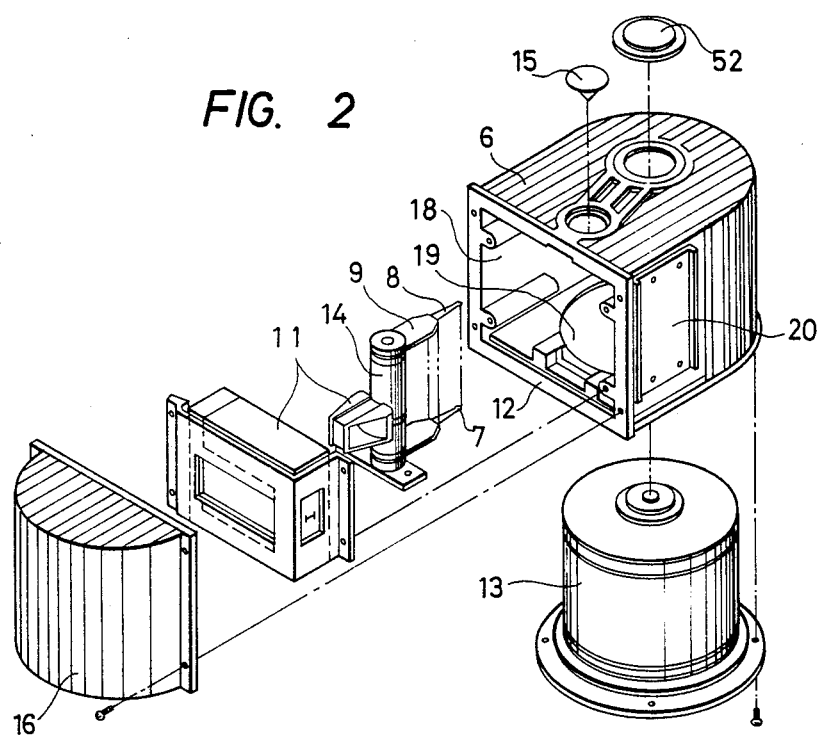
FIG. 2 is a perspective view showing the procedure for assembling the disc device of FIG. 1.

The construction of and the procedure for assembling the magnetic disk unit of FIG. 1 are shown in FIG. 2. The bearing structure 51 is assembled as one spindle structure 13 in which the spindle hub 2, spindle motor 4, rotary spindle 3 and magnetic disks 1 are incorporated. The spindle structure 13 is set in the housing 6 through a second aperture part 19 provided in a lower wall thereof, and the rotary spindle 3 is supported at its upper portion on the bearing structure 52.

The actuator hub 10 in which the magnetic heads 7 are incorporated is assembled as a positioning structure 14 along with the bearing structure 53 and bearings, and inserted through the first aperture part 18 into the first housing 6 and fixed therein. The bearings 17 are fixed to the first housing 6 by a centering member 15. The centering member 15 forms the bearing structure 50 together with the bearing 17A.

The VCM 11 is set in the first housing 6 through the dividing surface 12, and this disk unit is sealed hermetically with the opposed second housing 2.

The first housing is provided with a third aperture part, which is not continuous with the first and second aperture parts, in a wall thereof which extends perpendicularly to the planes including the first and second aperture parts. The third aperture is used to take out a disk head holding jig and tools from the first housing after the actuator has been inserted thereinto, and insert an erase head into the housing when a positioning signal is to be written on a disk. This third aperture part can be sealed hermetically with a cover 20. Owing to this third aperture part, the magnetic heads of the servo writer can be inserted therethrough into the housing with the magnetic disks 1 rotated around the spindle hub. This enables a servo track which is not made eccentric to be obtained.

Owing to the above-described arrangement, the two rotary shafts are supported at their both ends on the bearing structures and first housing. Accordingly, the occurrence of thermal unevenness, which causes a positioning error, can be minimized, and a disk unit having a high resistance to vibration can be obtained. Since the first housing is formed so as to enclose the magnetic disks therein, the rigidity thereof becomes high. Furthermore, owing to the dividing surface formed in parallel with the rotary shaft of the actuator hub, the installing of the parts in the housing can be done easily.

According to the present invention, the spindle and positioning structure, the rotary shafts of which are supported at their both ends on the housing, can be set therein, and this enables the improvement of the vibration resistance of the disk unit, the suppression of the occurrence of thermal unevenness which causes a positioning error, and the improvement of the part-assembling efficiency.

Moreover, the first, second and third aperture parts are not continuous with one another, and the first housing is formed integrally. This enables the twisting rigidity and bending rigidity of the housing to increase to high levels.

What we claim is:

1. A housing structure for a disk drive that includes a disk for recording information, a rotatable spindle shaft supporting said disk, a transducer for writing and reading information to and from said disk and a transducer positioner positioning said transducer to a desired position on said disk, comprising:

a disk housing having parts for supporting both ends of said spindle shaft and for enclosing said disk, spindle shaft, transducer and transducer positioner, said disk housing comprising a first housing and second housing, said first housing being separated from said second housing along a plane substantially in parallel with said spindle shaft; and wherein said first housing includes supports for both ends of said spindle shaft, and one of said supports being at a first aperture greater than a plane size of the disk for enabling insertion of said disk with said spindle shaft supporting said disk into the first housing, and the end of said spindle shaft corresponding to said first aperture being supported by a supporting member fixed to said first aperture.

2. A housing structure according to claim 1, wherein said first housing has a side wall having a second aperture and further comprises a cover plate enabling closing of said second aperture.

3. A housing structure according to claim 1, wherein one end of said spindle shaft is supported by said first housing through a first bearing support and the other end of said spindle shaft is supported by said supporting member through a second bearing support.

4. A housing structure according to claim 1, wherein said transducer positioner comprises:
a plurality of arms to which a plurality of transducers are fixed;
a rotatable shaft supporting said arms; and
means for rotatably driving said plurality of arms,
wherein, both ends of said rotatable shaft are supported by said first housing.

5. A disk drive housing structure according to claim 4, wherein said means for rotatably driving comprises a voice coil motor, a part of which is fixed to said housing at a part corresponding to the plane of separation between said first housing and second housing.

6. A housing structure according to claim 1, wherein said first housing has an upper wall for supporting an upper end of said spindle shaft and a lower wall in parallel with said upper wall and having said first aperture.

7. A housing structure according to claim 6, wherein said first aperture has a circular shape.

8. A disk drive housing structure according to claim 6, wherein said transducer positioner comprises:
a plurality of arms to which a plurality of transducers are fixed;
a rotatable shaft for supporting said arms; and
means for driving said arms,
wherein, both ends of said rotatable shaft are supported by said first housing.

9. A disk drive housing structure according to claim 8, wherein an upper end of said spindle shaft is supported by said first housing through a first bearing support and the lower end of said shaft is supported by said supporting member through a second bearing support.

10. A housing structure for a disk drive that includes at least one disk for recording information, a rotatable spindle shaft supporting said at least one disk, at least one transducer for writing and reading information to and from said at least one disk, and a transducer positioner positioning said at least one transducer to a desired position on said at least one disk, comprising:
a disk housing having an upper wall and lower wall for supporting both ends of the spindle shaft and for containing said at least one disk, spindle shaft, transducer and positioning means, said disk housing comprising a first housing and a second housing, said first housing being a part of said disk housing separated from said second housing along a plane substantially parallel with said spindle shaft wherein said first housing has said upper and lower walls for supporting both ends of said spindle shaft with a first and second bearing support respectively, said lower wall being parallel with said upper wall and having a first aperture the diameter of which is greater than a diameter of said at least one disk to enable insertion of said at least one disk with said spindle shaft supporting said at least one disk into the first housing, and the lower end of said spindle shaft being supported by a supporting member fixed to said aperture part, and wherein said transducer positioner has a plurality of arms to which a plurality of transducers are fixed, a rotatable shaft for supporting said arms, and means for rotatably driving said plurality of arms, and wherein the ends of said rotatable shaft are supported by said first housing.

* * * * *